United States Patent [19]

Sturman et al.

[11] Patent Number: 5,251,659

[45] Date of Patent: Oct. 12, 1993

[54] HIGH SPEED MINIATURE SOLENOID

[76] Inventors: Oded E. Sturman, 3973 Santa Monica Ct., Newbure Park, Calif. 91320; Benjamin Grill, 9819 Etiwanda Ave., Northridge, Calif. 91329; Walter L. Harrison, 23554 Cherry St., Newhall, Calif. 91321

[21] Appl. No.: 733,733

[22] Filed: Jul. 22, 1991

[51] Int. Cl.⁵ .................. F16K 11/04; F16K 31/06
[52] U.S. Cl. .................. 137/339; 137/625.5; 251/129.07; 251/129.16; 335/281
[58] Field of Search .............. 137/339, 625.5, 625.65; 251/129.07, 129.16; 335/255, 261, 279, 281

[56] References Cited

U.S. PATENT DOCUMENTS

| | | | |
|---|---|---|---|
| 1,700,228 | 1/1929 | Kendall | 251/129.16 X |
| 2,930,404 | 3/1960 | Kowalski et al. | 251/129.16 X |
| 2,934,090 | 4/1960 | Kenann et al. | 137/625.5 |
| 3,368,791 | 2/1968 | Wells | 251/129.16 X |
| 3,995,652 | 12/1976 | Belart et al. | 137/625.65 X |
| 4,409,638 | 10/1983 | Sturman et al. | 251/129.16 X |

FOREIGN PATENT DOCUMENTS 264710 1/1950 Switzerland ............... 251/129.16

*Primary Examiner*—Gerald A. Michalsky
*Attorney, Agent, or Firm*—Blakely, Sokoloff, Taylor & Zafman

[57] ABSTRACT

A solenoid valve which has a first magnetic core that is separated from a second magnetic core by a bushing. The bushing has an inner corner that sits within an outer seat of the first magnetic core, and an outer seat that cooperates with an inner seat of the second magnetic core such that the magnetic cores capture the bushing.

11 Claims, 2 Drawing Sheets

HIGH SPEED MINIATURE SOLENOID

BACKGROUND OF THE INVENTION

1. Field of the Invention

This invention relates to solenoids typically used to control the flow of a fluid.

2. Description of Related Art

Solenoids are used in a variety of applications, such as flow control valves in a hydraulic or pneumatic system. Typically solenoid valves are placed between a pump or compressor and an actuator, such that the valve will allow fluid to flow to the actuator when the solenoid is energized. The flow of fluid causes the actuator to extend, retract or rotate, depending upon the construction of the actuating device. The actuator can be part of a robot or other automated equipment, wherein movement of the actuator performs some type of work function such as lifting, drilling, etc.

Automated machines commonly have a plurality of actuators and solenoids all connected to an electronic controller, which energizes the solenoids in accordance with a program stored within the controller. In some applications the movement of the actuator is dependent upon the amount of time that the solenoid is energized. Typically, there is a lag between the time that the solenoid is energized and the moment when the valve is opened. To have an accurate movement of the actuator, this lag time must be compensated for by the programmer. The lag time is amplified by any inefficient use of the magnetic flux generated by the coil. It would therefore be desirable to have an efficient solenoid that has a short time difference between the energizing of the solenoid coil and the complete movement of the solenoid armature.

In general, all valves have a number of moving parts that are subject to wear and must be replaced, thereby reducing the life of the device. When the valve is part of a machine, the equipment must be shut down while the valve is replaced or repaired. As the frequency of valve switching increases, the life of the part becomes shorter. It would therefore be desirable to have a high speed solenoid valve which has a long operating life.

SUMMARY OF THE INVENTION

The present invention is a high speed solenoid valve, which has a housing with an inlet and outlet that are typically connected to a pneumatic system to control the flow of air across the valve. The solenoid has a first magnetic core coaxial with an armature. Wrapped around the first core is a coil that is connected to a source of power. The coil emits a magnetic flux when current flows through the coil. Adjacent to the coil is a second magnetic core that is attached at one end to the first core and spaced from the opposite end of the first core by a first bushing. Attached to the armature is a magnetic plate that is adjacent to the spaced apart ends of the first and second cores. When the coil is energized, the magnetic flux flows through the magnetic cores and plate, pulling the plate toward the cores and moving the armature from a first to a second position. The second core has a unique Z shape near the plate. The Z shape allows the cores to be sufficiently separated so that there is minimal flux leakage between the first and second cores. The Z shape also insures that the area of each core that faces the plate is the same, so that there is not a saturation of magnetic flux at either core.

The solenoid valve has a rod that is adjacent to the armature, such that the rod is moved from a first position to a second position by the armature, when the plate is pulled by the magnetic field of the coil. A spring is attached to the rod to push the rod and armature back into the first position when the coil is deenergized. The spring is attached to the rod at a point away from the cores and coil, thereby reducing the width of the valve. The rod has a first spool at one end which is seated on a second bushing, such that the first spool prevents fluid communication between the housing inlet and outlet when the rod is in the first position. When the coil is energized and the rod is moved into the second position, the first spool is unseated from the second bushing to allow air to flow through the valve. The first spool and second bushing are arranged so that any back pressure from the outlet cannot open the valve.

The rod has a second spool that balances the forces on the rod, so that the first spool does not unseat and open when pressurized air is introduced into the valve inlet. The second spool is constructed to let air flow from the inlet to an exhaust port to cool the valve. The rod may also have a third spool that seats on a third bushing. When the armature and rod are moved from the first to the second positions, the third spool engages the third bushing before the plate strikes the cores, thereby reducing the wear between the cores and the plate. The third spool and third bushing are constructed from a hard material which increases the life of the valve. The separation of the return spring from the coil and the unique configuration of the cores, provides a small high speed solenoid that is capable of switching between the first and second positions within 0.0002 seconds.

Therefore it is an object of this invention to provide a high speed solenoid.

It is also an object of this invention to provide a solenoid valve with a long operating life.

It is also an object of this invention to provide a self cooling solenoid valve.

It is also an object of this invention to provide a solenoid valve that will not allow back pressure from the outlet to open up the valve.

DETAILED DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
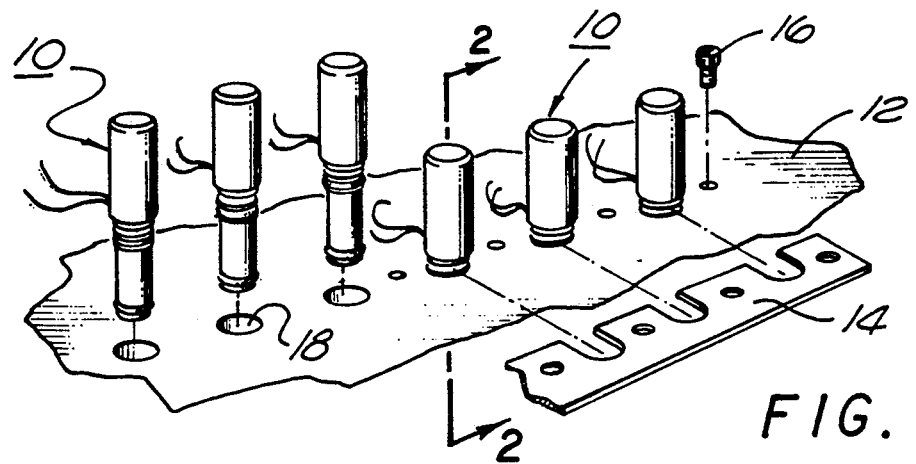
FIG. 1 is a perspective view showing a plurality of solenoid valves of the present invention attached to a mounting block.
Figure 2:
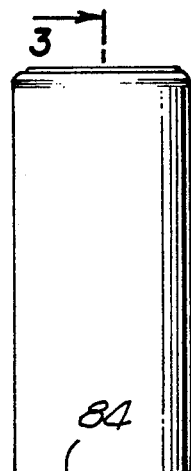
FIG. 2 is a side view of a solenoid valve mounted to the mounting block, taken at line 2—2 of FIG. 1.

Referring to the drawings more particularly by reference numbers, FIG. 1 shows a plurality of solenoid valves 10 of the present invention. The solenoids 10 can be mounted to a mounting block 12, by inserting a retainer plate 14 onto the solenoids 10 and attaching the plate 14 to the mounting block 12 with a plurality of screws 16. As shown in FIG. 2, each solenoid 10 extends within a bore 18 in the block 12. The solenoid 10 may have a first O-ring 20 that sits within a first groove 22 and engages a collar 24 in the mounting block 12. The solenoid 10 may also have a second O-ring 26 that fits within a second groove 28 and is pressed against the block 12. The O-rings seal the block 12 to prevent any fluid flow through the bore 18. The solenoids 10 are of the miniature variety, wherein the valves are typically 1.5 inches long and 0.3 inches in diameter. The valves of the present invention require little space and are highly desirable for robotics or other automated equipment with a small profile.

Figure 3:
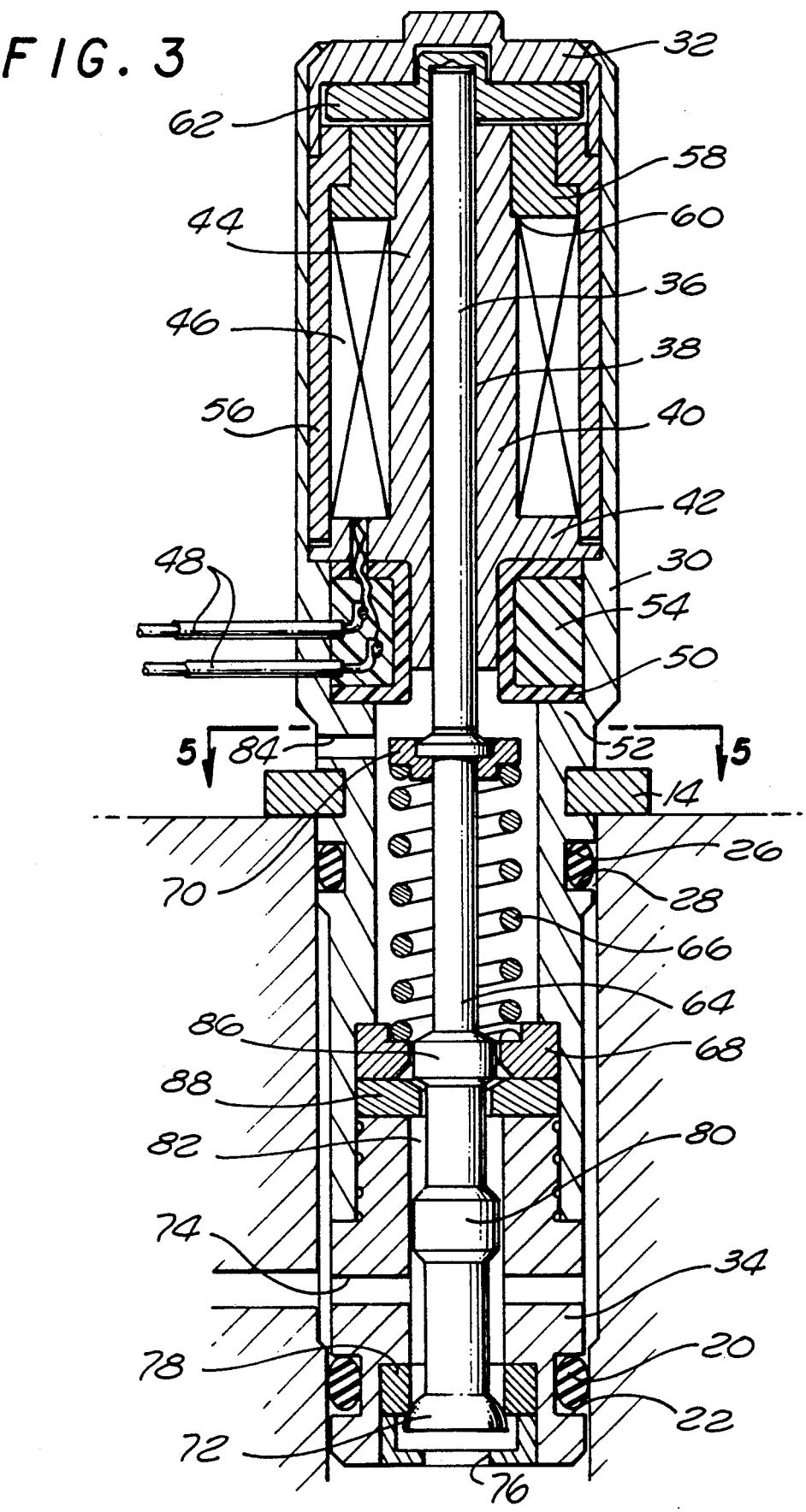
FIG. 3 is a cross sectional view of the solenoid valve of FIG. 2, taken at line 3—3.

FIG. 3 shows the internal assembly of the solenoid valve 10. The solenoid 10 has a housing 30 with an end cap 32 and a valve plug 34 attached at each respective end. Within the housing 30 is an armature 36 that extends through a bore 38 within a first magnetic core 40. The armature 36 is constructed to move within the bore 38 relative to the core 40. The first core 40 is cylindrical in shape and has a flange 42 at one end. Wrapped around the stem 44 of the first core 40 is a coil 46. The coil 46 is attached to a pair of leads 48 which connect the coil 46 to a source of power (not shown). The coil 46 is preferably constructed from 28 gauge wire that is wrapped and taped in a conventional manner known in the art. The coil 46 is wound around the first core 40, so that when power is supplied to the coil 46 the coil produces a magnetic flux. The leads 48 are attached to the coil 46 within a bobbin 50, which lies on a collar 52 of the housing 30. The bobbin 50 supports the first core 40 within the solenoid 10. The bobbin 50 may be filled with an epoxy 54 or other similar material to protect the leads and coil terminations.

Coaxial with the first core 40 is a cylindrical second magnetic core 56, which has one end connected to the flange of the first core 40 and a second opposite end spaced from the first core 40 by a first bushing 58. The first bushing 58 is preferably constructed from a non-magnetic material such as 300 series stainless steel and is seated on a radial lip 60 of the first core 40. The second end of the second core 56 has a Z shaped profile that matches the L shaped first bushing 58. With this arrangement, any pressure exerted onto the second end of the second core 56 is transmitted through the first bushing 58 and first core 40. To compensate for machine tolerances, there is typically a gap 59 between the first end of the second core 56 and the flange 42 of the first core. The gap 59 insures that the second core 56 is always in contact with the first bushing 58.

Figure 4:
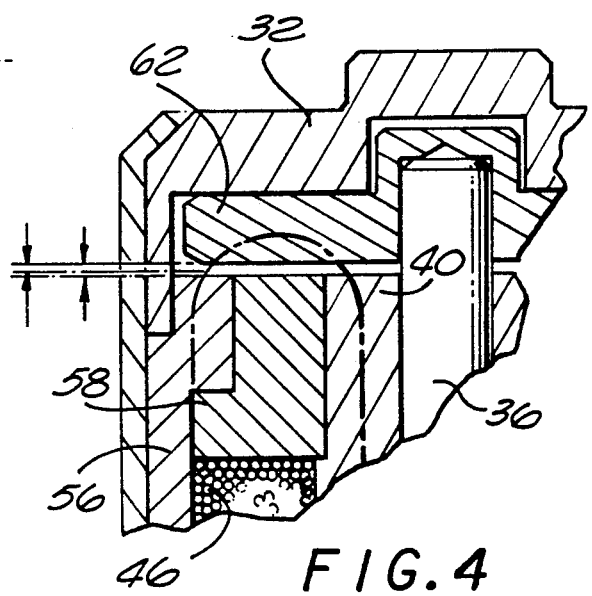
FIG. 4 is an enlarged view of the valve showing the relationship between the magnetic cores and the magnetic strike plate of the solenoid.

Attached to one end of the armature 36 is a magnetic plate 62. As shown in FIG. 4, the plate 62 is spaced a predetermined distance from the cores 40 and 56. When the coil 46 is energized, a magnetic flux 64 is created that flows through the first core 40, into the plate 62 and back through the second core 56. The magnetic flux 64 pulls the plate 62 toward the cores, moving the armature 36 from a first position to a second position. The unique Z shaped second core 56 provides advantages over solenoids in the art. First, the Z-shape allows the second core 56 to be spaced sufficiently from the stem 44 of the first core 40, so that there is little flux leakage between the cores across the coil 46. This insures a maximum amount of flux flowing from the second core 56 into the plate 62 and back through the first core 40.

This efficient flow of flux provides a small time lag between the energizing of the coil and the generation of the force necessary to move the plate 62 and armature 36. Second, the shape of the second core 56 provides an area facing the plate 62, that is approximately the same as the area of the first core 40 facing the plate 62. This equal core area prevents a concentration of flux density at one of the cores, again providing a more efficient flow of magnetic flux.

Figure 5:
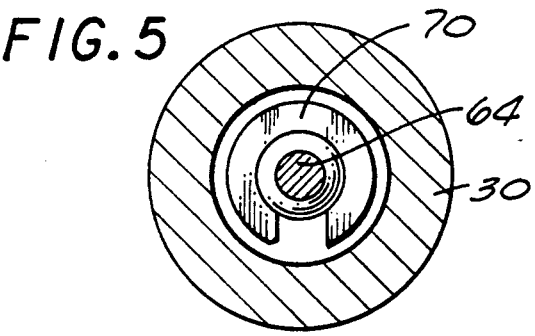
FIG. 5 is a cross sectional view taken at line 5—5 of FIG. 3.

The solenoid valve 10 has a rod 64 with one end adjacent to the armature 36. The rod 64 is either in contact with or in close proximity to the armature 36, so that when the armature 36 is moved from the first position to the second position, the rod 64 is moved from a first position to a second position. Coaxial with the rod 64 is a spring 66 that sits within a L shaped bushing 68. The other end of the spring 66 is restrained by a collar 70 that is attached to the rod 64, as shown in FIG. 5. The collar 70 is preferably C shaped so that the collar 70 can easily clip onto the end of the rod 64. The spring 66 biases the rod 64 into the first position, so that when the armature 36 and rod 64 are in the second position and the coil 46 is deenergized, the spring 66 pushes the rod 64 and armature 36 back into the first positions.

The rod 64 has a first spool 72 that controls the flow of fluid between an inlet 74 and an outlet 76 in the housing 30. The inlet 74 is typically connected to a source of air, wherein the first spool 72 allows or prevents air from flowing from the inlet 74 to the outlet 76. Although a pneumatic system is described, it is to be understood that the solenoid valve 10 of the present invention could be adapted for a hydraulic system. The first spool 72 is seated on a second bushing 78, such that the spool 72 prevents fluid communication between the inlet 74 and outlet 76 when the rod 64 is in the first position, and the spool 72 allows fluid communication between the inlet 74 and outlet 76 when the rod 64 is in the second position. Thus when the coil 46 is energized and the rod 64 is moved into the second position, the first spool 72 is unseated from the second bushing 78 so that air can flow from the inlet 74 to the outlet 76. When the coil 46 is deenergized, the spring 66 moves the rod 64 back into the first position, wherein the first spool 72 is seated on the second bushing 78 to prevent air from flowing through the solenoid valve 10.

The rod 64 may have a second spool 80 located between the inlet 74 and the spring 66. The second spool 80 has a diameter approximately the same as the diameter of the first spool 72, so that any air pressure supplied at the inlet 74 produces an equal but opposite force on both the first 72 and second 80 spools. The second spool 80 thus provides a balance, so that the first spool 72 remains seated on the second bushing 78 when the coil 46 is deenergized. The diameter of the second spool 80 is slightly smaller than the bore 82 of the valve plug 34, so that air can flow from the inlet 74 to an exhaust port 84. This flow of air cools down the various moving parts within the solenoid and prolongs the life of the solenoid, particularly when the valve is subjected to numerous high speed switches.

The rod 64 may have a third spool 86 that sits within a third bushing 88. The spool 86 is normally separated from the bushing 88 when the rod 64 is in the first position, so that air can flow from the inlet 74 to the exhaust port 84. The spool 86 and bushing 88 are constructed and assembled, such that the space between the two members is less than the space between the plate 62 and cores. In this manner the third spool 86 will engage the third bushing 88 before the plate 62 strikes the cores. The lack of contact between the plate and cores eliminates wear on the magnetic members, which are typically constructed from a soft ferrite material. The rod and accompanying spools are preferably constructed from a hardened steel. The second and third bushings are preferably constructed from a hard material such as ceramic or tungsten carbide. Making the rod and bushings from a hard material reduces the wear and increases the overall life of the valve 10. By having a separate rod and armature, the machine tolerances on most of the parts can be relaxed, wherein any tolerance build up can be compensated for by the gap between the armature and rod. The present invention thus provides a solenoid valve 10 which insures that the first spool 72 is normally fully seated on the second bushing 78, so that that there is no air leakage due to an oversized armature 36, etc. Although a separate rod and armature are described and shown, it is to be understood that a single armature, with accompanying spools, may extend from the coil to the outlet.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A solenoid valve, comprising:
   a housing having an inlet and an outlet;
   an armature within said housing;
   a first magnetic core coaxial with and adjacent to said armature, said first magnetic core having a first end and a second end, said second end further having an outer seat;
   a coil wrapped around said first magnetic core, said coil being constructed to emit a magnetic flux;
   a second magnetic core coaxial with said first magnetic coil, said second magnetic core having a first end connected to said first end of said first magnetic core and a second end spaced from said second end of said first magnetic core, said second end having an inner seat;
   a first bushing between said first and second magnetic cores, said first bushing having an inner corner which sits within said outer seat of said first magnetic core and an outer seat that cooperates with said inner seat of said second magnetic core so that said first bushing is captured by said first and second magnetic cores;
   a magnetic plate adjacent to said second ends of said first and second magnetic cores and attached to said armature, such that when said coil emits said magnetic flux said magnetic plate moves toward said magnetic cores, wherein said armature moves within said housing from a first position to a second position;
   a rod within said housing and adjacent to said armature such that when said armature moves from said first position to said second position, said rod moves from a first position to a second position, said rod having a first spool located relative to said outlet such that when said rod is in said first position said first spool prevents fluid communication between said inlet and said outlet, and when said rod is in said second position said first spool allows fluid communication between said inlet and said outlet; and,
   a spring operatively connected to said rod to bias said rod and said armature into said first position.

2. The solenoid valve as recited in claim 1, wherein said first bushing is constructed from steel.

3. The solenoid valve as recited in claim 1, wherein said second magnetic core has an area facing said magnetic plate that is approximately equal to an area of said first magnetic core that faces said magnetic plate.

4. The solenoid valve as recited in claim 1, further comprising a second bushing within said housing, said second bushing being adapted such that said first spool seats against said second bushing when said rod is in said first position and said first spool is unseated from said second bushing when said rod is in said second position, said first spool and second bushing being assembled to prevent fluid from flowing to said inlet from said outlet.

5. The solenoid valve as recited in claim 4, wherein said rod has a second spool that balances fluid pressure from said inlet such that said first spool prevents fluid communication between said inlet and said outlet when said rod is in said first position.

6. The solenoid valve as recited in claim 5, wherein said rod has a third spool that engages a third bushing when said rod is in said second position, such that a space exists between said magnetic plate and said magnetic cores when said armature is in said second position.

7. The solenoid valve as recited in claim 1, wherein said housing has an exhaust port that allows fluid to flow from said inlet through said housing.

8. A solenoid valve, comprising:
   a housing having an inlet and a outlet;
   an armature within said housing;
   a first magnetic core coaxial with and adjacent to said armature, said first magnetic core having a first end and a second end, said second end having an outer seat;
   a coil wrapped around said first magnetic core, said coil being constructed to emit a magnetic flux;
   a second magnetic core coaxial with said armature, said second magnetic core having a first end connected to said first end of said first magnetic core and a Z shaped second end spaced from second, said second end having an inner seat end of said first magnetic core;
   a first bushing between said second end of said first magnetic core and said second end of said second magnetic core said first bushing having an inner corner which sits within said outer seat of said first magnetic core and an outer seat that cooperates with said inner seat of said second magnetic core so that said first bushing is captured by said first and second magnetic cores;
   a magnetic plate adjacent to said second ends of said first and second magnetic cores and attached to said armature, such that when said coil emits said magnetic flux said plate moves toward said magnetic cores, wherein said armature moves within said housing from a first position to a second position;
   a second bushing within said housing adjacent to said outlet;
   a rod within said housing and adjacent to said armature such that when said armature moves from said first position to said second position, said rod moves from a first position to a second position, said rod having a first spool with a predetermined diameter, said first spool being adjacent to said second bushing such that when said rod is in said first position said first spool is seated on said second bushing to prevent fluid communication between said inlet and said outlet, and when said rod is in said second position said first spool is unseated from said second bushing to allow fluid communication between said inlet and said outlet, said rod further having a second spool with a diameter approximately equal to said diameter of said first spool such that said second spool balances fluid pressure from said inlet so that said first spool is seated on said second bushing when said rod is in said first position; and, a spring operatively connected to said rod to bias said rod and said armature into said first position.

9. The solenoid valve as recited in claim 8, wherein said rod has a third spool that engages a third bushing when said rod and said armature are in said second position, such that a space exists between said magnetic plate and said magnetic cores when said armature is in said second position.

10. The solenoid valve as recited in claim 9, wherein said housing has an exhaust port and said second and third spools are adapted to allow fluid to flow from said inlet to said exhaust port when said rod is in said first position.

11. The solenoid valve as recited in claim 10, wherein said first bushing is constructed from steel.

* * * * *